July 1, 1924.
E. M. HAUSHEER
1,499,924
MACHINE FOR CUTTING TUBULAR STOCK INTO CONTINUOUS STRIPS
Filed July 20, 1923     3 Sheets-Sheet 2
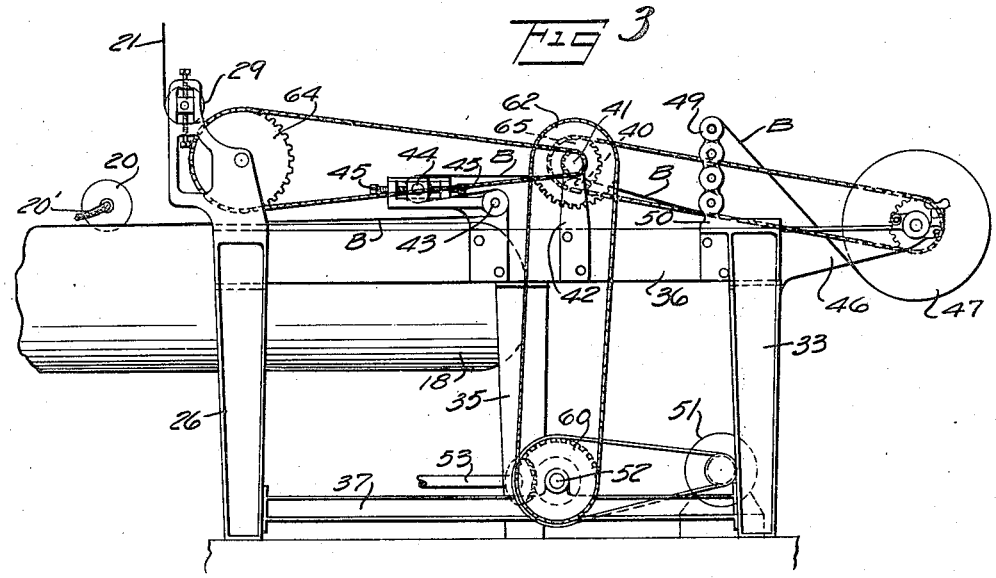
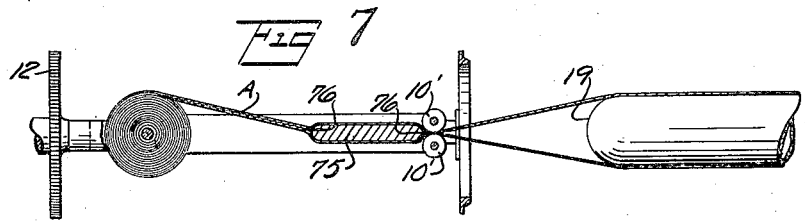
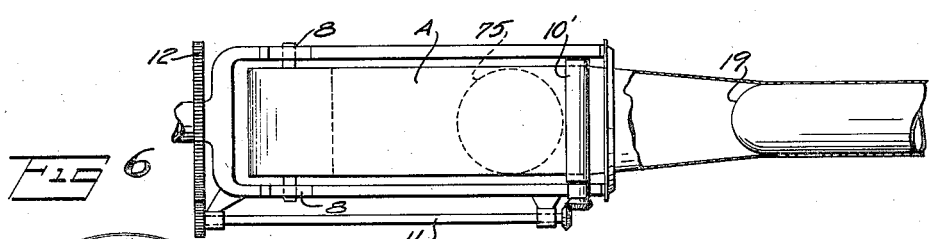
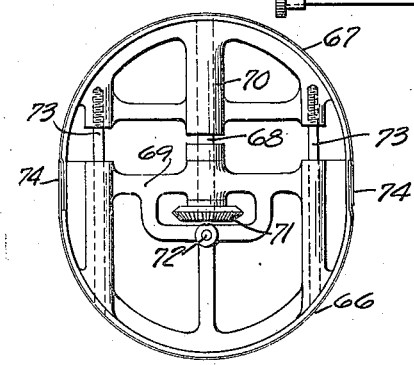
INVENTOR
Erich M. Hausheer
BY
Richard Eyre
ATTORNEY July 1, 1924.  
E. M. HAUSHEER  
1,499,924  
MACHINE FOR CUTTING TUBULAR STOCK INTO CONTINUOUS STRIPS  
Filed July 20, 1923  
3 Sheets-Sheet 3
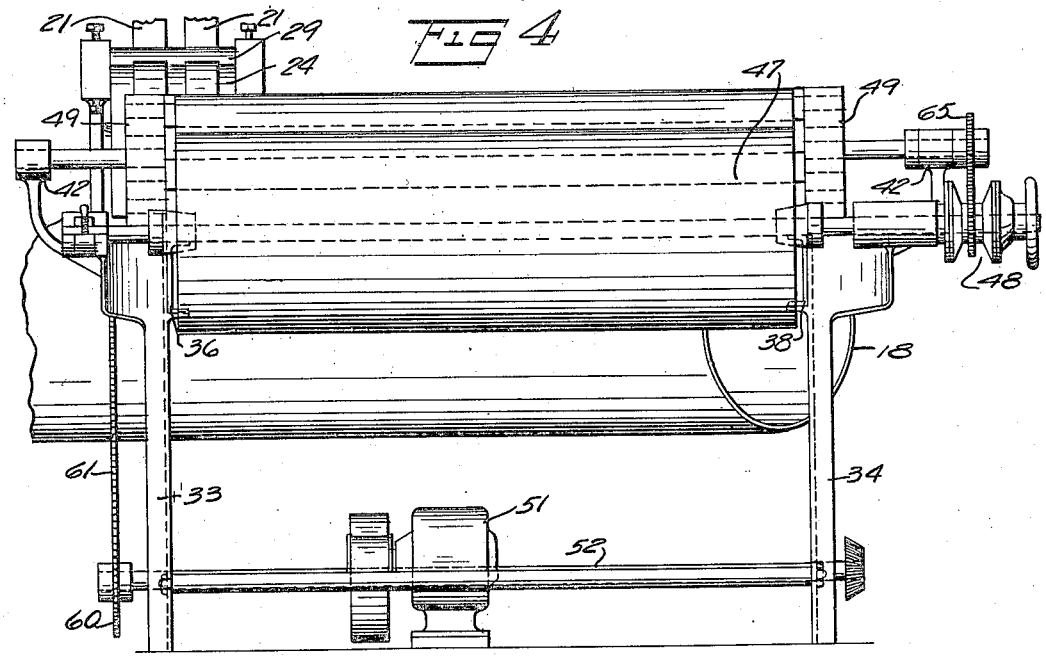
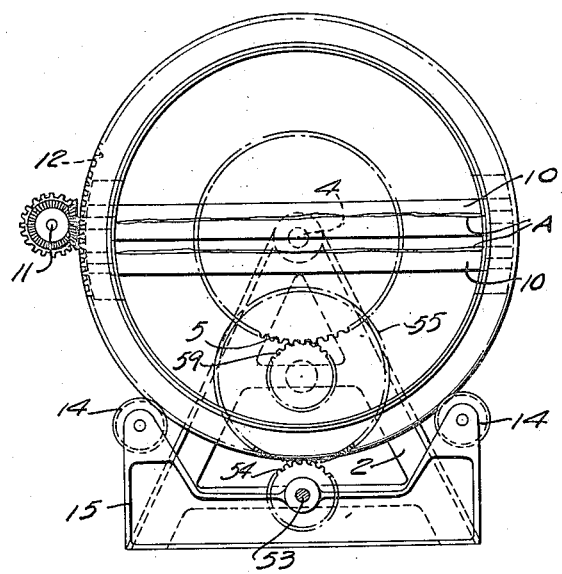
INVENTOR  
Emil M. Hausheer  
BY  
Richard Eyre  
ATTORNEY Patented July 1, 1924.

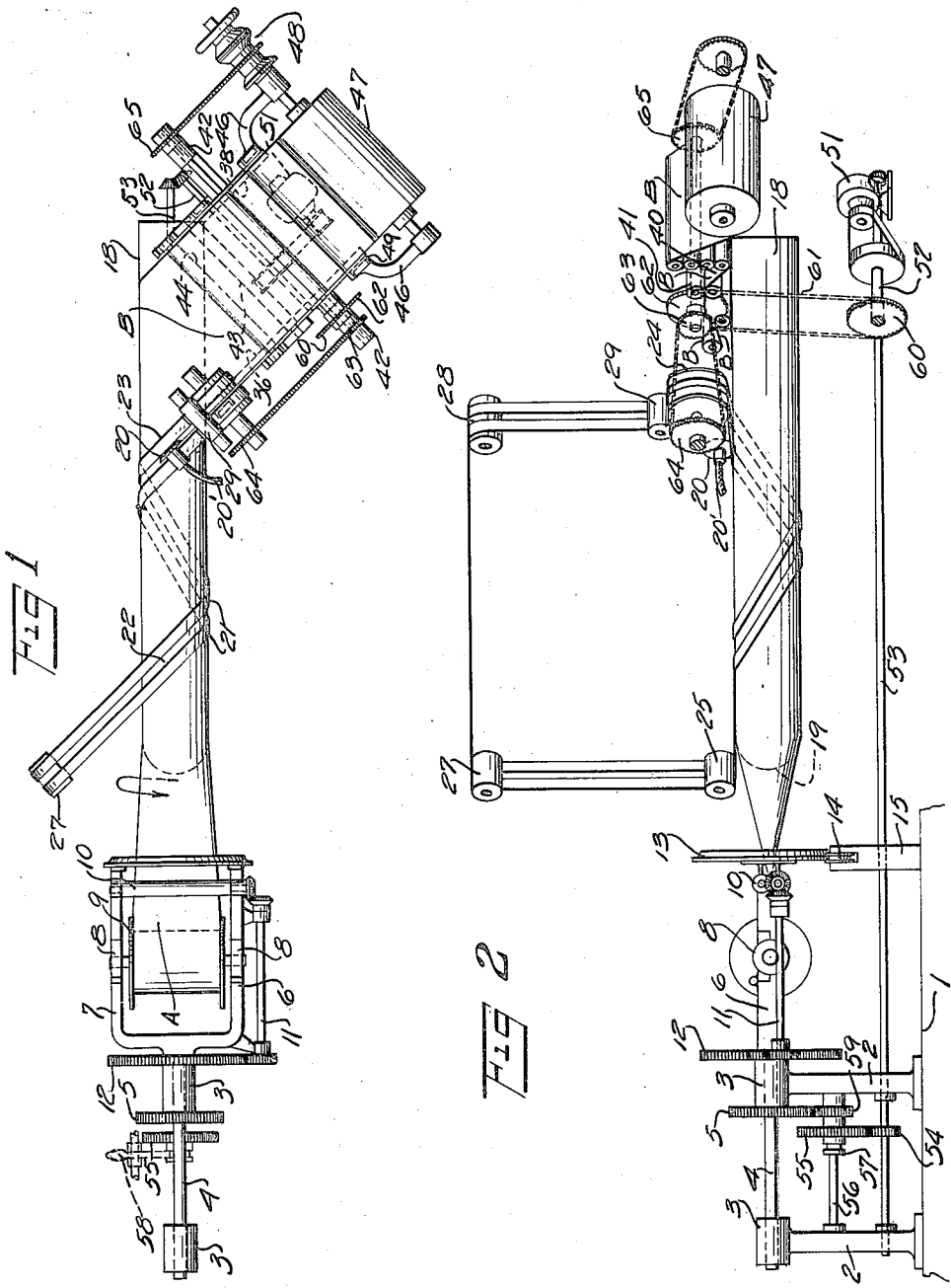

1,499,924

UNITED STATES PATENT OFFICE.

EMIL M. HAUSHEER, OF SCHENECTADY, NEW YORK, ASSIGNOR TO MICA INSULATOR COMPANY, OF NEW YORK, N. Y., A CORPORATION OF NEW JERSEY.

MACHINE FOR CUTTING TUBULAR STOCK INTO CONTINUOUS STRIPS.

Application filed July 20, 1923. Serial No. 652,676.

*To all whom it may concern:*

Be it known that I, EMIL M. HAUSHEER, a citizen of the United States, residing at #19 Eagle Street, Schenectady, Schenectady County, New York, and whose postoffice address is #19 Eagle Street, Schenectady, New York, have invented new and useful Improvements in Machines for Cutting Tubular Stock into Continuous Strips, of which the following is a specification.

This invention relates to an apparatus for spirally cutting tubular stock into a straight continuous length or strip and especially tubing of a woven material of a weave to form a straight piece of continuous length with the woven threads or fibers running on a bias therein.

Such continuous lengths are particularly useful in forming bias cut tape which is employed in the manufacture of wearing apparel and automobile tires and in the insulation of conductors, coils and other electrical devices. The object of the invention, generally stated, is an apparatus whereby the tubing may be formed into continuous strips or lengths of more uniform character than has hitherto been possible, the continuous lengths formed according to my invention being substantially uniform in width throughout and unimpaired from edge to edge and thereby being capable of being economically cut into tape of narrow dimensions without appreciable waste. A further object of the invention is a machine for cutting tubing into continuous lengths with greater speed and efficiency than is possible with the prior devices with which I am familiar, and which is entirely automatic in its operation and requires a minimum of attention. To these ends I have devised a novel machine of simple character capable of automatically cutting woven tubing on a spiral into a continuous length of substantially uniform width, having novel cooperating elements for assuring at all times the synchronous feeding and uniform and even progression of the tubular stock through the machine to and past the cutting mechanism without unduly tensioning any part of the tubing before it reaches the cutting element or distorting and impairing the formed strip in its passage from the cutting element to the take-up mechanism. More particularly my novel apparatus comprises a stationary mandrel, preferably of cylindrical and elongated form, on to which is continuously fed the tubular stock and a distributed advancing mechanism disposed spirally or on a helical curve about the mandrel, between the cutting mechanism and the feeding mechanism, for assuring a uniform spiral progression of the stock through the machine—this advancing mechanism preferably consisting of frictional engaging means which does not impair the tubular stock, the embodiment herein shown being a continuous belt, distributed throughout a substantial distance in front of the cutting mechanism and engaging the tubing at a multiplicity of points spirally about the mandrel. The unwinding mechanism is rotated in the ordinary manner on an axis substantially coincident with the axis of the mandrel, and the advancing mechanism grips the tubing about the mandrel in a multiplicity of points over a spiral thereabout and positively feeds the tubing in a uniform manner, being assisted in this advancing operation by a positive feeding element which unwinds the tubing from the supply mechanism. My machine also comprises a special take-up mechanism for receiving and properly disposing of the spirally cut strip as it comes from the cutting mechanism without impairing or distorting the formed strip.

For a better understanding of my invention, together with the novel features thereof including those briefly indicated above and others which will hereinafter appear, reference may be had to the accompanying drawings forming a part of this application, wherein:

Fig. 1 is a plan view of my novel apparatus illustrated more or less diagrammatically.

Fig. 2 is a side view corresponding to Fig. 1.

Fig. 3 is a side view of the take-up and winding mechanism.

Fig. 4 is a front view of the take-up mechanism.

Fig. 5 is an end view of the unwinding mechanism.

Fig. 6 is an end to sectional view of a mandrel which may be used to advantage.

Fig. 7 is a view of a modified feeding and tube separating mechanism, and

Fig. 8 is a plan view of the same.

Referring to the drawings where like numerals designate similar parts throughout, I have illustrated my novel apparatus as mounted upon a suitable base or other foundation 1 and on this foundation there are disposed a pair of A-shaped standards 2, suitably spaced apart and carrying at their upper ends a pair of aligned bearings 3 in which is journaled a shaft 4. The latter carries a driving gear 5 disposed adjacent the right hand bearing 3 through which the shaft may be driven at suitable speed. The shaft 4 overhangs the right hand bearing 3 and carries rigidly therewith a U-shaped frame having elongated arms 6 and 7, these arms extending parallel to the shaft 4 and carrying substantially midway therein a pair of bearings 8 in which is journaled a roll of tubing stock 9 which is to be cut on a spiral, the axis of the latter passing through the axis of the shaft 4 and at right angles thereto. The arms 6 and 7 carry at their outer ends a pair of cooperating unwinding rollers 10 which are suitably journaled therein and are adapted to positively draw the pillow tubing A from the roll 9 and feed it forward to the other elements of the machine, as hereinafter described. The unwinding rolls 10 may be driven in any suitable manner, as for example by means of a shaft 11, carried by the arm 6 and having on one end a gear meshing with one of the gears on the rollers 10 and on the other end a gear meshing with a stationary circular rack 12 which is carried by the right hand standard 2. The U-frame carries on its free end an annular bearing support or ring 13, the latter being secured to the arms 6 and 7 in any suitable manner with its center in the axis of shaft 4. This ring support rotates with the rotation of the U-frame on three guide rollers 14 carried by a cradle 15 and serves to center and maintain the unwinding mechanism in operative alignment.

On the right of the base 1 there is disposed a stationary cylindrical mandrel 18 suitably supported in axial alignment with the shaft 4, the free end of the mandrel 18 being suitably tapered or rounded as indicated at 19 to facilitate the feeding of the pillow or stock tubing A thereover. A suitable cutter, as for example a single rotary knife 20 is mounted above the mandrel 18 and is disposed at a 45° angle to the axis of the mandrel to cut a strip from the tubular stock, the rotary cutter being mounted and driven in any suitable manner, as for example by a flexible shaft 20' connecting with a driving means (not illustrated). The rotary cutter 20 preferably revolves in a slot 21 disposed in the surface of the mandrel and serves to cut a straight strip B from the tubing as it is progressively and spirally fed forward and advanced over the mandrel 18. The cutter 20 is located at a point substantially removed from the free end 19 of the mandrel to accommodate a cooperating mechanism now to be described.

For effecting a uniform and smooth spiral or helical progression of the tubular stock A, along the cylindrical mandrel 18, I have provided between the cutting mechanism 20—20' and the free end 19 of the mandrel a special advancing, feeding and distributing mechanism comprising means engaging the stock and spirally disposed about the mandrel 18. In the particular embodiment illustrated this consists of a double traveling belt 21 which frictionally grips the tubular stock A tightly around the periphery of the mandrel 18 and advances the same forward and spirally thereabout. The double flexible belt 21 straddles the cutter 20 and in the particular embodiment illustrated makes one complete turn about the mandrel (the preferred arrangement), engaging it first at the point 22 on the top thereof and passing forwardly and underneath the mandrel and continuing to engage therewith to the point 23 adjacent to or slightly past the rotary cutter 20. This belt or distributing device is maintained in the proper position relatively to the different cooperating mechanisms by means of a pair of double pulleys 24 and 25, these being mounted to rotate in planes at 45° angles to the axis of the mandrel 18 and having their lowermost surfaces subtantially on a level with the upper surface of the mandrel 18. The pulley 24 is mounted on and journaled in the standard 26 and is driven in the manner hereinafter described. The continuous belt 21 also passes over the guide pulleys 27 and 28, and these together with the pulley 25 may be supported in any convenient manner. In order to provide for adjustment of the tightness of the belt, as for example to compensate for slackness or to adjust for different sizes of mandrels, either of the pulleys may be adjustably mounted, or a suitable idler pulley 29 which is journaled in the upper end of standard 26 substantially on a level with the upper surface of the pulley 24 may be adjustably mounted in any suitable manner for this purpose, as for example by means of adjustable bearings. The rotary cutter 20 is placed closely adjacent the advancing and feeding belt at the point 23 of the mandrel, and preferably between the two belts as illustrated, and the cut therefore takes place substantially along the edge of the feeding belt, the fabric being thereby held tightly and smoothly against the mandrel surface at the cutting point and a smooth cut or slit being assured on the edge of the formed strip B. If the belt itself, or other spirally disposed advancing mechanism, is not of a character to grip or engage the stock about the mandrel with sufficient firmness to avoid undue slippage, the mechanism may be provided with a special roughened or gripping surface to effect a more positive advancement. Ordinarily with a mandrel of cylindrical shape (the preferred shape), no special gripping means need be employed other than the friction between the belt and the tubular stock.

The strip B thus obtained as it comes from the rotary cutter 20 with the machine properly adjusted, is of uniform character and it is desired that a take-up mechanism for this strip be of such character as not to impair the uniform and even formation of the strip after it is formed or interfere with its formation. I have therefore provided a special take-up mechanism which cooperates with the unwinding and advancing mechanisms heretofore described to gradually and synchronously withdraw the cut strip from the mandrel 18 as it is formed and wind it into suitable rolls for handling. For this purpose I have provided a framework consisting of the standards 26, 33, 34 and 35 with horizontal upper and lower frame members 36 and 37 on one side, and corresponding horizontal frame members 38 and 39 on the other side. The members of this framework may consist of channel or other section beams, as may be desired in practice. This take-up mechanism comprises a pair of positive take-off rollers 40 and 41, these rollers being journaled on a bracket 42 suitably secured to the horizontal beams 36 and 38. These two rollers positively take up the strip B as it is cut and comes from the mandrel, and preferably these rollers are mounted slightly above the level of the cylindrical mandrel 18 as indicated. The take-up mechanism also preferably comprises a pair of rollers 43 and 44 mounted on suitable brackets 45 carried by the horizontal beams 36 and 38 located between the mandrel and the positive take-up rollers 40 and 41. The arrangement of these rollers is such that the strip B passes first over the roller 43 and then recedes backwardly to the roller 44, passing over the top thereof through and between the take-off rollers 40 and 41. The roller 44 may be, if desired, mounted in adjustable bearings, set screws 45 being provided for adjusting the position of the roller 44 with reference to the roller 43. The strip B is finally rolled into rolls by the reeling mechanism carried by horizontal extensions 46 formed on the standards 33 and 34 respectively. The roll of cut bias is indicated at 47 and this is driven through the medium of a friction driven mechanism 48 for permitting speed variations inversely to the variations in the diameter of the roll 47. Between the reeling mechanism and the positive take-up rollers 40 and 41 there may be provided if desired a series of rollers 49 which are mounted on a standard 50, carried by the upper ends of the standards 33 and 34. In the particular embodiment illustrated there are four of these tension rollers, the strip B passing first under the lower roller and then upwardly back and forth about all of the rollers and from whence it is taken up by the roll 47.

The various mechanisms comprising the unwinding part, the spirally arranged advancing belt 21, and the take-up mechanism, must be properly adjusted with reference to each other and driven in synchronism. In the particular embodiment illustrated, the driving mechanism comprises an electric motor 51, suitably mounted with reference to the mechanisms to be driven, which drives the main power shaft 52, the latter being journaled in any convenient manner in the framework. The shaft 52 is geared on its rear end to a transmission shaft 53 by means of beveled gears as illustrated, and the transmission shaft 53 extends forwardly through the cradle 15 and is suitably journaled on the standards 2. It carries on its forward end a pinion 54 which, in turn, meshes with another pinion 55, the latter being journaled upon the shaft 56 and having interposed in the connection a suitable clutch or control mechanism 57 including an operating handle 58 for connecting the gear 55 with another pinion 59 journaled on the shaft 56. The pinion 59 intermeshes with the gear 5 and when the shaft 53 is rotated and the clutch mechanism 57 thrown in, the shaft 4 together with the unwinding mechanism, is set into operation to unwind and withdraw the tubular stock from the roll. For driving the advancing and feeding continuous double belt 21 the shaft 52 has mounted on its forward end a pulley 60 which by means of a belt 61 transmits power to an upper pulley 62 carried by the roller shaft 41. The roller shaft 41 in turn carries another pulley 63, which in turn is belted to a pulley 64 carried by the shaft of the rolls 24. The rotation of the rolls 24 drives the continuous belt 21 which passes about the mandrel 18 in the helical curve or spiral manner above described. The positive take-off rollers 41 are driven by means of the pulley 62, and the roller shaft 41 has on its rear end a pulley 65 which is suitably connected by a belt or chain with the friction drive mechanism 48 and the roller 47.

The operation of the machine is indicated above.

When the motor 51 is set in operation and the various mechanisms are properly adjusted and arranged with reference to each other, the unwinding mechanism rotates the reel and the rollers 10 unwind the tubular stock A from the reel and feed it gradually to the tapered end 19 of the mandrel 18. After the tubular stock reaches the mandrel 18 it is caused to assume a uniform spiral advancing movement by means of the double continuous spirally arranged belt 21. This belt also has a smoothing function in that it maintains an even progression of the tubular stock without wrinkles up to and past the rotary cutter 20, so that not only is a strip of uniform dimensions cut, but it is also assured that the cut is smooth and even, leaving both edges of the finished strip unimpaired and ready for the cutting of the narrow tape therefrom. The strip B may be treated with varnish or other materials suitable for its intended use prior to being cut into narrow tape, and standard machinery or equipment may be employed for this purpose. Such treatment is desired at this stage because it is not practical to treat the bias with a varnish or other material after it is cut into narrow tape strips, and it is difficult to treat the tubular stock so as to get a smooth uniform film of varnish on both sides of the fabric. The rollers 43 and 44 present the strip in a flat and straight manner to the positive take-off rolls 40 and 41 and these mechanisms, together with the tension rolls 49 and the friction take-up roll 47, insure the take-up and winding of the cut strip in a manner not to injure or impair the strip, and rolls it up ready for the cutting of the narrow tape therefrom. The various mechanisms should be adjusted with references to each other so that there is just sufficient tension between the rolls 10 and the mandrel 18 to cause the tubular stock to slip over the tapered end thereof, the main function of the continuous spirally arranged conveyor 21 being to positively advance and feed the tubular stock spirally about the mandrel 18 to the rotary cutter 20. While this is the main function, however, it is understood that the positive unwinding rollers 10 may be omitted in certain cases and the continuous spiral conveyor means relied upon to apply the unwinding tension also. The take-up mechanism should also be adjusted to avoid undue tension on the formation of cut strip after it leaves the rotary cutter, the preferable arrangement being such that the slack is merely taken up without substantial tension thereon. The double belt 21 with the rotary cutter therebetween is preferred in certain instances to the single belt, in that it provides a smoothing means on both sides of the rotary cutter during the cutting operation, thereby insuring a more even and uniform cut, and that for certain materials a uniform spiral progression and feeding movement of the tubular stock is rendered more certain. Experience has shown that for some materials to be cut, a double belt making a complete spiral turn on the tube works most satisfactorily. On other materials, however, especially a material with a fairly stiff finish one belt is sufficient, and on a light grade material a belt making a half spiral turn feeds the material forward entirely satisfactorily. When using one belt in making a half spiral only, the diagrammatically illustrated pulleys 25, 27, 28 and 29 must of course be located so as to properly drive the belt.

The tubular fabrics of commerce vary more or less from their rated sizes, and, therefore, it is desirable that the mandrel should be adjustably expansible, as is customary with regard to mandrels. Fig. 6 shows a convenient form of expansible mandrel having semi-circular parts 66 and 67 movable towards and away from each other by a screw 68 journaled in a member 69 carried by the semi-circular member 66, the screw 68 cooperating with the screw-threads on a member 70 carried by semi-circular member 67 and having on its lower end a beveled gear 71 which may be turned in any suitable manner as for example by a similar meshing gear on the rotatable longitudinal shaft 72. Guide pins 73 are carried by the upper member 67 and cooperate with aligned guide sockets formed in the member 69 for guiding the adjustable movements of the members 66 and 67 relatively to each other. These members 66 and 67 are provided on their peripheries with telescopically arranged members 74 for the purpose of avoiding interruptions in the surface thereof. In its collapsed or least distended position, the mandrel is preferably circular and approximates a circular shape after slight expansions.

I have found in practice that the tubular stock often tends to stick together and necessitates appreciable tension to cause it to slip over the rounded end 19 of the mandrel 18. I may, therefore, provide a special means for positively separating the two layers of tubular stock which may adhere to each other and thereby avoid the necessity for special force or tension to draw the tubing over the mandrel. I have illustrated this means in Figs. 7 and 8, which comprises a member 75 in the form of a flat disc with rounded edges 76 which I insert within the tubular stock A in front of the positive unwinding rollers 10. The depth and shape of this member 75 are such as to avoid passing between the rollers 10′ and as the tubular stock is positively drawn forward by the rollers 10′ this member 75 positively separates the layers of stock from each other, so that the tubing is caused to slide easily over the stationary mandrel 18 and begin its spiral forward movement thereover under conditions most favorable for the uniform advancement and progression thereof.

As heretofore indicated the mechanisms herein disclosed are more or less diagrammatically illustrated with a view to convenience in exposition of the principles and functions thereof, certain of the details in the manner of mounting the various elements being omitted. I have described the various power transmitting means 60, 61, 62, 63 and 64 as pulley and belt transmissions, but it is obvious that if desired positive synchronous devices, such as sprocket and chain or gear transmissions, may be provided.

Having thus described my invention, what I claim and desire to protect by Letters Patent is:

1. In a machine of the type involving the simultaneous movement of tubular stock along and around a mandrel and a cutter arranged to cut the stock on the bias while on the mandrel, a spirally disposed traveling advancing means arranged about said mandrel in front of said cutter and adapted to engage said stock at a plurality of points on a helical curve about the mandrel for spirally advancing the tubular stock to the cutter.

2. In a machine of the type involving the simultaneous movement of tubular fabric stock along and around a mandrel and a cutter arranged to cut the stock on the bias while on the mandrel, a spirally disposed traveling gripping member adapted to grip said tubing at a plurality of points on a helical curve about said mandrel in advance of the cutter and advance the same spirally thereabout to the cutter.

3. In a machine of the type involving the simultaneous movement of the tubular fabric along and around a mandrel and a cutter disposed to cut the fabric on the bias while on the mandrel, two parallel spirally disposed traveling gripping members adapted to engage surfaces of the fabric at a plurality of points a substantial distance in advance of the cutter.

4. In a machine of the type involving the simultaneous movement of the tubular fabric along and around a mandrel and a cutter disposed to cut the fabric on the bias while on the mandrel, a spirally disposed traveling gripping member adapted to engage surfaces of the fabric at a plurality of points a substantial distance in advance of the cutter.

5. In a machine of the type involving the simultaneous movement of tubular fabric stock along and around a mandrel and a cutter disposed to cut the fabric on the bias while on the mandrel, and a continuous traveling belt passing around the forward end of said mandrel and adapted to frictionally engage the tubing fed to the mandrel and advance it forward and spirally to said rotary cutting knife.

6. In a machine of the type involving the simultaneous movement of tubular fabric stock along and around a mandrel and a cutter disposed to cut the fabric on a bias while on the mandrel, a double continuous feed belt passing spirally around said mandrel and adapted to engage the tubing and positively advance the same forwardly and spirally thereabout to said cutter, together with means for driving said double belt in unison with the rotary movement of the tubular stock.

7. In a machine of the type involving the simultaneous movement of tubular fabric stock along and around a mandrel and cutting the same into a continuous strip, two parallel closely adjacent continuous belts passing spirally around said mandrel and adapted to engage the tubing and positively advance the same forwardly and spirally thereabout, and a cutter disposed between the belts and adapted to cut the tubular stock along the path defined by the inner edges of the spirally arranged belts.

8. In a machine of the character set forth in claim 3 wherein the mandrel is of cylindrical form.

9. In a machine of the type involving the simultaneous movement of a tubular fabric along and around a mandrel and a cutter disposed to cut the fabric on the bias while on the mandrel, feeding means for the fabric comprising means for rotating a roll of tubular fabric, means for feeding the tubular fabric from the rotating roll to the mandrel, two spirally disposed traveling gripping members adapted to engage surfaces of the fabric on the mandrel at a plurality of points a substantial distance in advance of the cutter, positively driven take-off rolls arranged to engage the cut fabric, and a take-up roll receiving the fabric from the take-off rolls.

10. In a machine of the type involving the simultaneous movement of tubular fabric along and around a mandrel and a cutter disposed to cut the fabric on the bias while on the mandrel, feeding means for the fabric comprising a rotating shaft carrying a roll of tubular fabric, together with means for rotating the same and feeding the tubular fabric from the rotating roll to the mandrel, a spirally disposed traveling gripping member adapted to engage surfaces of the fabric on the mandrel at a plurality of points a substantial distance in advance of the cutter, together with means for driving the mechanisms in unison.

11. In a machine of the type involving the simultaneous movement of tubular fabric along and around a mandrel and a cutter disposed to cut the fabric on the bias while on the mandrel, a spirally disposed gripping member adapted to engage sections of the fabric on the mandrel at a plurality of points a substantial distance in advance of the cutter and positively driven take-off rolls arranged to engage the cut fabric as it comes from the machine.

12. A machine of the character set forth in claim 11, comprising a plurality of tension rolls cooperating with the positive take-off rollers.

13. In a machine of the type involving the simultaneous movement of a tubular fabric along and around a mandrel and a cutter disposed to cut the fabric on the bias while on the mandrel, feeding means for the fabric comprising means for rotating a roll of tubular fabric, a pair of positively driven rollers for withdrawing the tubular stock from the rotating roll and feeding it to the mandrel, spirally disposed travelling means adapted to engage surfaces of the fabric on the mandrel on a helical curve in advance of the cutter and positively driven take-off rolls arranged to engage the cut fabric and withdraw it from the cutter.

14. In a machine of the type involving the simultaneous movement of a tubular fabric along and around a mandrel and the cutting of the fabric on the bias while on the mandrel including a rotating supply roll carrier, a mandrel and a separating disc separate from the mandrel and adapted to be contained within and rotated with the tubular fabric and disposed between the mandrel and the supply roll carrier.

15. In a machine of the character set forth in claim 14 a pair of positively driven withdrawing rolls disposed between the supply roll and the mandrel wherein the separating disc is adapted to be disposed between the supply roll and the positively driven withdrawing rolls and is of a shape to prevent its jamming the withdrawing rolls.

16. In a machine for cutting tubular fabric on the bias, a rotating carrier for a roll of tubular fabric, a stationary mandrel over which the fabric is adapted to be drawn and a separating member separate from the mandrel and adapted to be contained within and rotated with the tubular fabric and disposed between the mandrel and the carrier.

17. In a machine of the type involving the simultaneous movement of a tubular fabric along and around a mandrel and the cutting of the tubular fabric on a bias while on the mandrel, a traveling member which is arranged externally about the mandrel and is adapted to engage the tubular fabric in advance of the point where the fabric is cut and to effect a uniform spiral progression of the tubular fabric about the mandrel up to the cutting point.

18. In a machine of the type involving the simultaneous movement of a tubular fabric along and around a mandrel and the cutting of the tubular fabric on a bias while on the mandrel, a rotating carrier for a roll of tubular-fabric, an elongatetd mandrel disposed in a position to receive the tubular fabric from the carrier, a spirally disposed traveling advancing means arranged externally about said mandrel and adapted to engage the tubular fabric on a helical curve about the mandrel for effecting uniform spiral progression of the tubular fabric to the point of the mandrel where it is cut on the bias and take-up means for receiving the spirally cut strip.

19. In a machine of the character set forth, a rotating tubular stock carrier, an elongated stationary mandrel adapted to receive the tubular stock, a cutter for cutting a strip from the fabric on the bias, take-up mechanism for the strip, and a traveling device adapted to engage the tubular stock at points in advance of the cutter and assist in imparting to the tubular stock rotary movement about the mandrel.

In testimony whereof, I have signed my name to this specification.

EMIL M. HAUSHEER.